United States Patent [19]
Izawa et al.

[11] Patent Number: 6,053,509
[45] Date of Patent: Apr. 25, 2000

[54] TIRE CONTACT LOAD CONTROL SYSTEM

[75] Inventors: Masaki Izawa; Kei Oshida; Hideaki Shibue, all of Wako, Japan

[73] Assignee: Honda Giken Kogyo Kabushiki Kaisha, Tokyo, Japan

[21] Appl. No.: 09/047,008

[22] Filed: Mar. 24, 1998

[30] Foreign Application Priority Data

Apr. 8, 1997 [JP] Japan .................................. 9-089202

[51] Int. Cl.⁷ ....................................................... B62D 9/02
[52] U.S. Cl. ...................................... 280/5.504; 280/5.52
[58] Field of Search ................................ 280/5.504, 5.52

[56] References Cited

U.S. PATENT DOCUMENTS

| | | | |
|---|---|---|---|
| 4,625,993 | 12/1986 | Williams et al. | 280/707 |
| 5,015,009 | 5/1991 | Ohyama et al. | 280/5.52 |
| 5,044,660 | 9/1991 | Yamamura et al. | 280/5.52 |
| 5,183,127 | 2/1993 | Kageyama et al. | 280/5.52 |
| 5,269,556 | 12/1993 | Heyring | 280/5.52 |

*Primary Examiner*—Kenneth R. Rice
*Attorney, Agent, or Firm*—Carrier, Blackman & Associates, P.C.; Joseph P. Carrier; William D. Blackman

[57] ABSTRACT

An active actuator is interposed between the unsprung mass and the sprung mass of a vehicle, and extended and retracted in a cyclic manner so as to apply a prescribed reaction to the unsprung mass during an extending stroke of the actuator. Thus, the additional contact load is applied to the tire in a cyclic manner over a desired period of time so that the gripping force of the tire can be increased over a desired period of time. Although the increase in the tire contact load and the reduction in the tire contact load occurs in an alternating, cyclic manner, it is possible to achieve an overall advantage for instance in reducing the braking distance by intermittently increasing the tire contact load of the rear wheels by detecting the braking action of the vehicle with a suitable acceleration sensor or the like. In particular, by setting a retracting stroke of the actuator substantially longer in time duration than an extending stroke of the actuator, it is possible to reduce the degree of the contact load reduction between each consecutive phase of contact load increase, and to achieve an even better overall result.

9 Claims, 4 Drawing Sheets

TIRE CONTACT LOAD CONTROL SYSTEM

TECHNICAL FIELD

The present invention relates to a tire contact load control system for increasing the road wheel contact pressure on the road surface as needed by actuating an actuator interposed between the sprung mass and the unsprung mass of the vehicle at a certain acceleration.

BACKGROUND OF THE INVENTION

The gripping force F of a tire can be given by the product of the frictional coefficient $\mu$ between the tire and the road surface and the vertical contact load W acting on the tire contact surface (F=$\mu$W). In other words, the tire contact load which plays an important role in the handling of the vehicle is proportional to the magnitude of the dripping force for a given road condition.

In a known active wheel suspension system, a linear actuator which can be actively extended and retracted is typically installed between the vehicle body and each road wheel so that the distribution of tire contact load may be distributed to the four different road wheels according to a prescribed control mode. For instance, U.S. Pat. No. 4,625,993 issued Dec. 2, 1986 to Williams et al. discloses an active wheel suspension system which controls the stroke of the hydraulic actuator provided in each road wheel so that the attitude of the vehicle body may be properly controlled when the vehicle is travelling. When the vehicle is travelling straight ahead, the tires are made to follow the irregular contour of the road surface so that the gravitational center of the sprung mass may be controlled or may stay at a relatively fixed height. When the vehicle is accelerating or decelerating, the load distribution between the front axle and the rear axle is appropriately changed so that the pitching movement of the vehicle may be controlled. When the vehicle is turning a curve, the load distribution between the right and left wheels is appropriately changed so that the rolling movement of the vehicle may be controlled.

According to such a conventional active wheel suspension system, the weight of the vehicle body was simply distributed between the different road wheels, and the sum of the contact pressures of the four road wheels was essentially constant. Therefore, such an active wheel suspension system was not able to increase the overall traction or braking force of the vehicle. When a linear actuator interposed between a wheel and a vehicle body is either extended or retracted at a certain acceleration, a corresponding inertia force is produced in the sprung mass and the unsprung mass. The reaction of such an inertia force may be used to increase the contact pressure of a road wheel. However, the linear actuator used for a conventional active suspension system is so limited in its available stroke, any increase in the contact pressure that may be achieved was too short-lived to serve any useful purpose.

BRIEF SUMMARY OF THE INVENTION

In view of such problems of the prior art, a primary object of the present invention is to provide a vehicle tire contact load control system which can increase the tire contact load of each road wheel for a desired period of time.

A second object of the present invention is to provide a vehicle tire contact load control system which allows the vehicle to come to a stop with a minimum braking distance.

A third object of the present invention is to provide a vehicle tire contact load control system which can minimize the slipping of tires, and increase the cornering force of the vehicle.

According to the present invention, such objects can be accomplished by providing a vehicle tire contact load control system, comprising: a wheel suspension system for supporting an unsprung mass including a wheel to a sprung mass including a vehicle body; an active actuator interposed between the unsprung mass and the sprung mass; and a controller for extending and retracting the actuator in a cyclic manner so as to apply a prescribed reaction to the unsprung mass during an extending stroke of the actuator.

Thus, an additional contact load is applied to the tire in a cyclic manner over a desired period of time so that the gripping force of the tire can be increased over the desired period of time. Although the increase in the tire contact load and the reduction in the tire contact load occurs in an alternating manner, it is possible to achieve an overall advantage for instance in reducing the braking distance by intermittently increasing the tire contact load of the rear wheels by detecting the braking action of the vehicle with a suitable acceleration sensor or the like. In particular, by setting a retracting stroke of the actuator substantially longer in time duration than an extending stroke of the actuator, it is possible to reduce the degree of the contact load reduction between each consecutive phases of contact load increase, and to achieve an even better overall result.

To avoid an undesired shock or impact at the end of each stroke, it is desirable to provide a cushioning interval near an end of a retracting stroke and an extending stroke of the actuator by gradually reducing the extending or retracting movement of the piston rod. The present invention may be applied not only to a pure active suspension system which exclusively depends on an active actuator for a wheel suspension system but also to a wheel suspension system which includes a suspension spring member and/or a damper (shock absorber). The application of the present invention is not limited in reducing the braking distance but also may be applied in avoiding the slipping of tires of an accelerating vehicle by increasing the tire loads of driven wheels, and improving the cornering performance of a vehicle by increasing the tire loads of the inner wheels.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
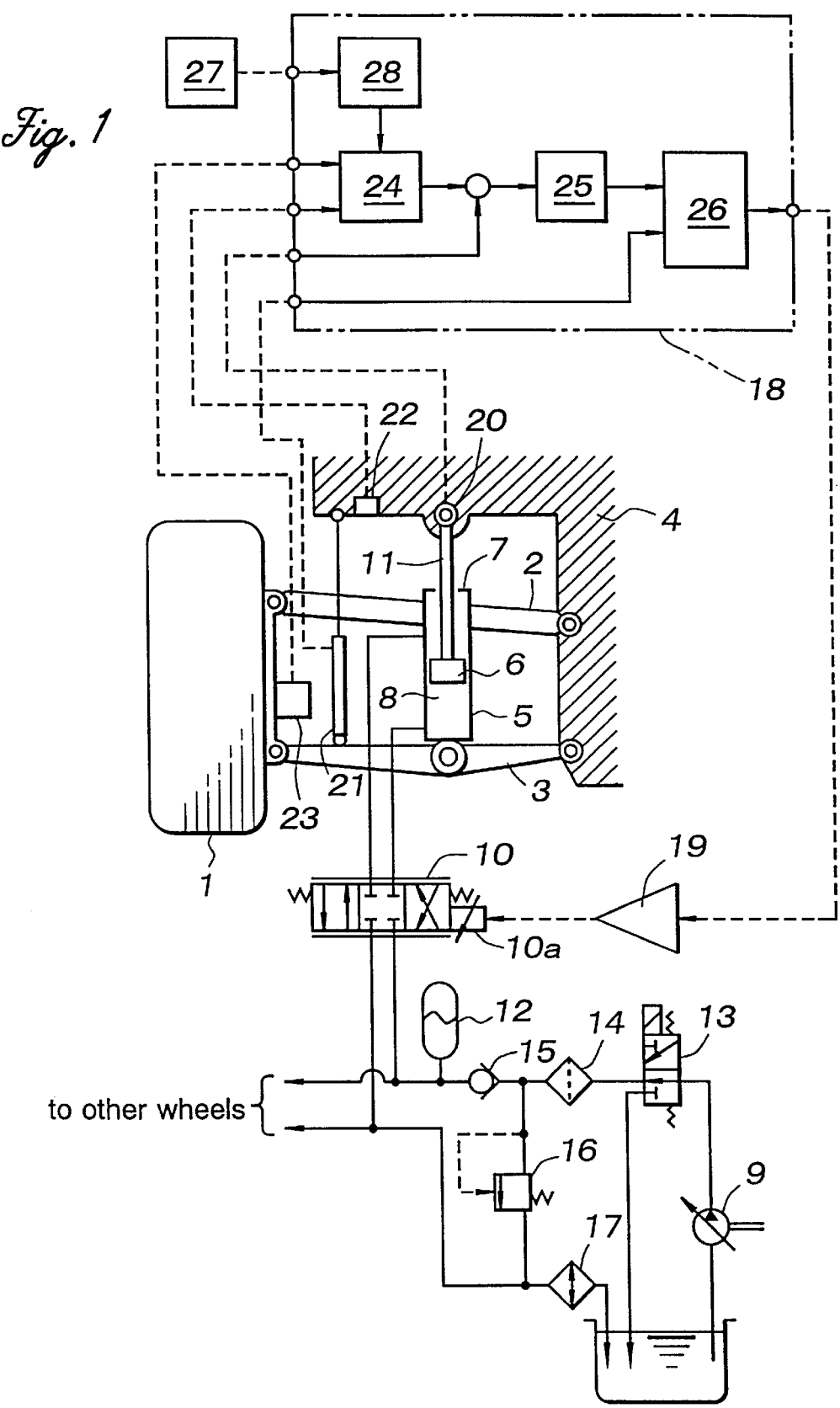
FIG. 1 is a schematic diagram showing a vehicle tire contact load control system embodying the present invention.

FIG. 1 schematically illustrates an essential part of an active wheel suspension system to which the present invention has been applied. A tire wheel 1 is supported by upper and lower suspension arms 2 and 3 so as to be moveable vertically with respect to a vehicle body 4. A linear actuator 5 consisting of a hydraulic cylinder is connected between the lower suspension arm 3 and the vehicle body 4. The linear actuator 5 includes a piston 6 received in a cylinder defining an upper oil chamber 7 and a lower oil chamber 8, and a thrust force is produced in a piston rod 11 by controlling the hydraulic pressures transmitted from a variable capacity oil pump 9 to these oil chambers 7 and 8 via a servo valve 10. Thereby, the relative distance between the center (axle) of the wheel 1 and the vehicle body 4 can be controlled at will.

The oil delivered from the pump 9 is initially stored in an accumulator 12 to remove the pulsating ripples in the oil pressure, and avoid shortage of the oil flow during a transient process. The pressure is then transmitted to each of the wheels 1 via the corresponding servo valve 10. This oil circuit further comprises an unloading valve 13, an oil filter 14, a check valve 15, an oil pressure regulating valve 16, and an oil cooler 17, but these components are conventional and are therefore not described here in any great detail.

The servo valve 10 controls the magnitude and direction of the hydraulic pressure applied to the hydraulic actuator 5 in a continuous manner according to a control signal supplied from an electronic control unit (ECU) 18 to a solenoid 10a of the servo valve 10 via a servo valve driver 19. The ECU 18 produces the control signal by processing output signals from a load sensor 20 interposed between the vehicle body 4 and the piston rod 11, a stroke sensor 21 interposed between the vehicle body 4 and the lower suspension arm 3, a sprung mass acceleration sensor 22 for detecting the vertical acceleration of the vehicle body 4, and an unsprung mass acceleration sensor 23 for detecting the vertical acceleration of each wheel 1 according to a control algorithm illustrated in FIG. 2.

Figure 2:
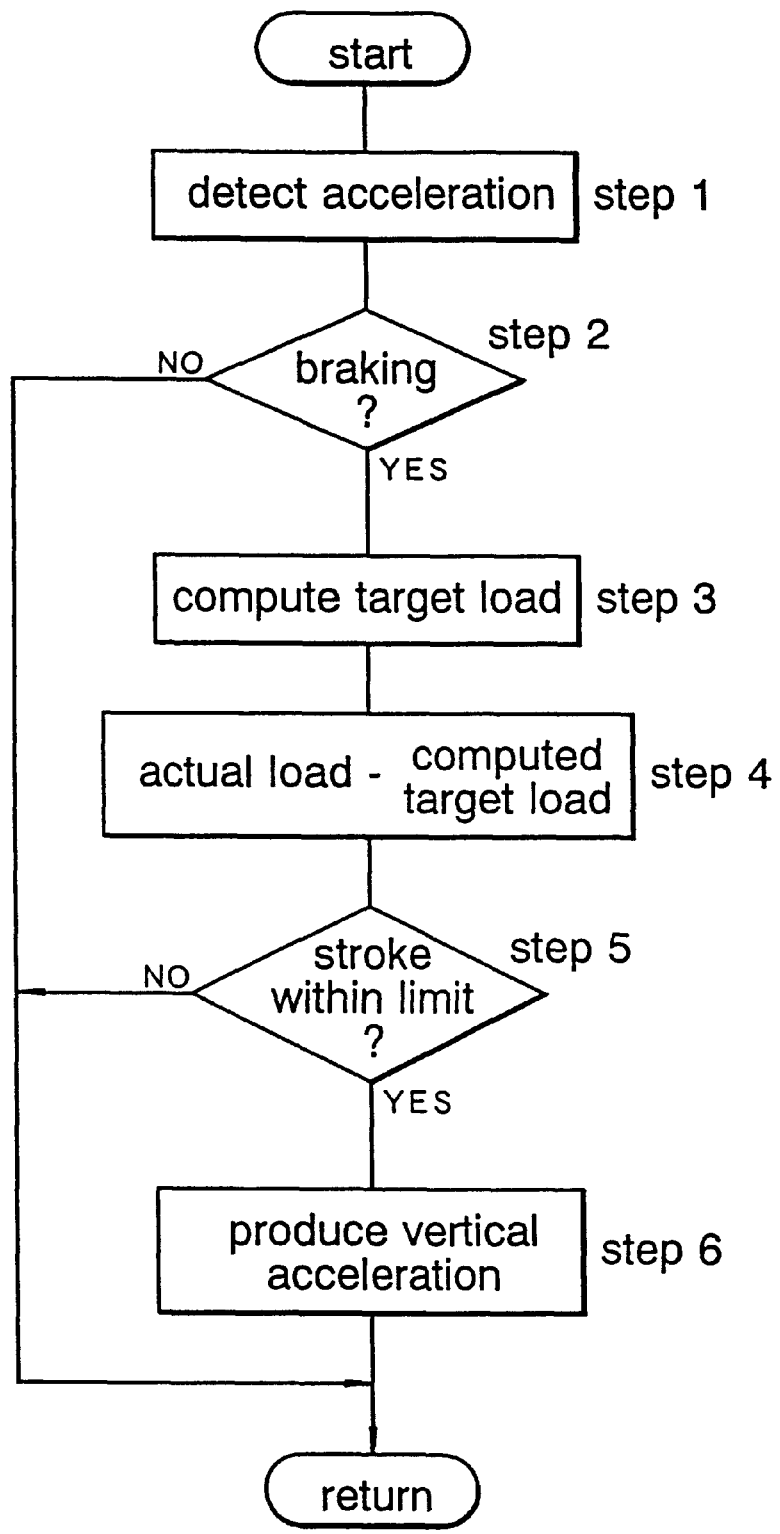
FIG. 2 is a control flow diagram of the control unit of the system illustrated in FIG. 1.

The control flow of the ECU 18 is now described in the following with reference to FIG. 2. An output signal from a fore-and-aft acceleration sensor 27 is supplied to a braking determination unit 28 (step 1), and it is determined if a braking action resulting in a prescribed deceleration level or greater has been detected (step 2). If a braking action of such a magnitude is detected, a provisional target load is computed according to the output signals from the sprung mass acceleration sensor 22 and the unsprung mass acceleration sensor 23 which are supplied to a target load computing unit 24 (step 3). A deviation of this value from the actual load or the output signal from the load sensor 20 is computed (step 4), and is processed by a stabilizing computation unit 25 which may, for instance, consist of an integration unit. The command signal supplied from the stabilizing computation unit 25 to the servo valve driver 19 is adjusted in a displacement limiting computation unit 26 by looking up the output signal from the stroke sensor 21 so that the stroke of the actuator 5 would not exceed the maximum possible stroke (step 5). The servo valve 10 is then controlled by the adjusted command signal to appropriately actuate the actuator 5 so as to make the actual load agree with the target load. Thus, a vertical acceleration is produced in either the sprung mass or the unsprung mass so as to increase the wheel contact load (step 6). This temporarily increases the gripping force of the tire, and reduces the braking distance by raising the limit of locking up the wheel.

Figure 3:
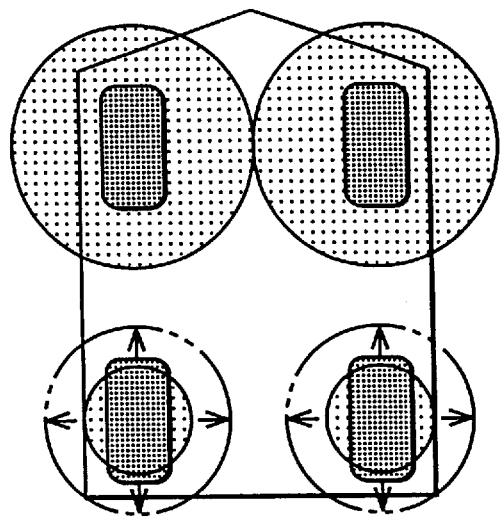
FIG. 3 illustrates a tire contact load distribution during a braking action according to the present invention.

FIG. 3 schematically illustrates the distribution of the tire contact load (=gripping force). The static contact load is indicated by solid circles, and the dynamic contact load or the contact load produced by the stroke of the actuator 5 is indicated by the double chain dot line. For instance when a brake is applied, the static contact load of the front wheel increases as indicated by the larger solid line circles as compared with the solid line circles drawn around the rear wheels. This tendency is even more enhanced when the vehicle is travelling on a downhill slope. Because of the relatively small contact load of the rear wheels, the rear wheels tend to lock up easily. If the contact load of the rear wheels is increased by the extending stroke of the actuator as indicated by the double chain dot line of FIG. 3, the tendency of the rear wheels to lock up is reduced, and the rear wheels can thereby produce a stronger braking force. This results in a reduced braking distance.

Figure 4:
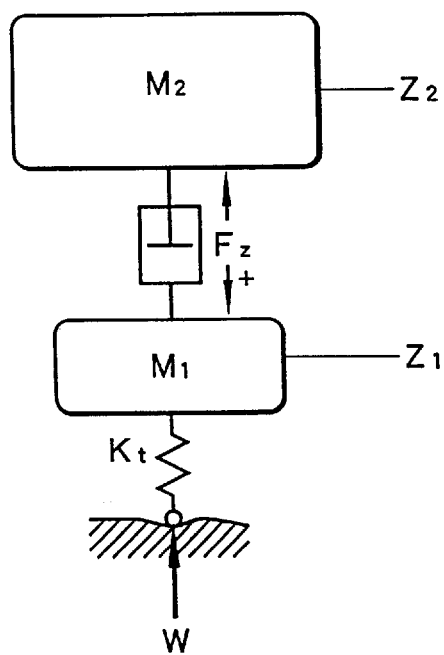
FIG. 4 is a diagram showing a mechanical model of a typical wheel suspension system.

The working principle of this invention is described in the following with reference to FIG. 4 in which the following notations are used.

$M_2$: sprung mass $M_1$: unsprung mass $Z_2$: position of the sprung mass $Z_1$: position of the unsprung mass Kt: spring constant of the tire Fz: thrust force of the actuator Suppose that the downward direction corresponds to a positive direction. Then, the equations of motion for the sprung mass $M_2$ and the unsprung mass $M_1$ are given as follows.

$$M_2 \cdot (d^2Z_2/dt^2) = -Fz$$

$$M_1 \cdot (d^2Z_1/dt^2) + Kt \cdot Z_1 = Fz$$

Therefore, the tire contact load W can be given by the following equation.

$$W = -Kt \cdot Z_1 = -Fz + M_1 \cdot (d^2Z_1/dt^2) = M_2 \cdot (d^2Z_2/dt^2) + M_1 \cdot (d^2Z_1/dt^2)$$

In other words, the tire contact load W can be given as a sum of the inertia forces of the sprung mass and the unsprung mass. Therefore the tire contact load W can be controlled by controlling the acceleration of extending and retracting the actuator, and thereby changing the inertia force of at least one of the sprung and unsprung masses. In particular, by controlling the individual actuator 5 for each of the wheels, it is possible to increase the contact load W of each tire at a desired timing. For instance, when the suspension stroke is 200 mm, and the actuator 5 can produce a thrust force of one ton or an acceleration of approximately 1 G, the maximum time duration of this inertia force will be approximately 0.2 seconds.

Figure 5:
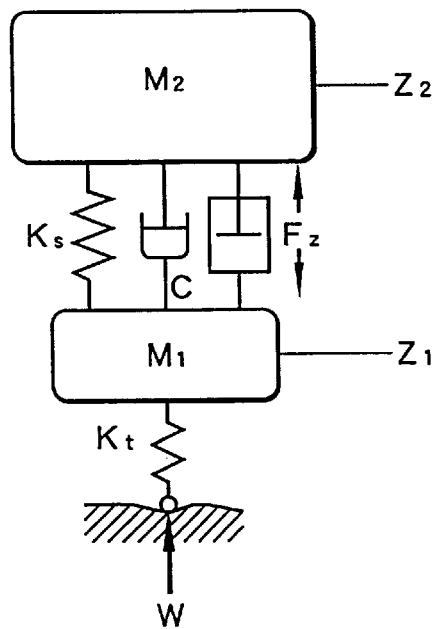
FIG. 5 is a diagram showing a mechanical model of a wheel suspension system with a tire contact load control system according to the invention.

Typically, with the aim of minimizing the energy consumption of each actuator, the proposed active wheel suspension system uses a suspension spring for supporting the weight of the vehicle body, and a damper for producing a damping force (see FIG. 5). In this case, if Ks is the spring constant of the suspension spring, and C is the damping coefficient of the damper, the equations of motion for the sprung mass $M_2$ and the unsprung mass $M_1$ are given as follows.

$$M_2 \cdot (d^2Z_2/dt^2) + C \cdot (dZ_2/dt - dZ_1/dt) + Ks \cdot (Z_2 - Z_1) = -Fz$$

$$M_1 \cdot (d^2Z_1/dt^2) + C \cdot (dZ_1/dt - dZ_2/dt) + Ks \cdot (Z_1 - Z_2) + Kt \cdot Z_1 = Fz$$

Therefore, the tire contact load W can be given by the following equation.

$$W = -Kt \cdot Z_1 = -Fz + M_1 \cdot (d^2Z_1/dt^2) + C \cdot (dZ_1/dt - dZ_2/dt) + Ks \cdot (Z_1 - Z_2)$$
$$= M_2 \cdot (d^2Z_2/dt^2) + M_1 \cdot (d^2Z_1/dt^2)$$

In other words, the tire contact load W can be likewise controlled by controlling the acceleration of extending and retracting the actuator.

The dynamic load produced by the acceleration of extending the actuator 5 only lasts until the piston rod 11 of the actuator 5 reaches an end of the stroke. Therefore, according to the present invention, as soon as the piston rod 11 reaches an end of the extending stroke, it is immediately retracted, and a new cycle of extending the piston rod may be started time and again. Therefore, the dynamic load on the wheel which increases the contact load of the tire can be maintained indefinitely or for a desired period of time by thus repeating the cyclic extension and retraction of the actuator (see FIG. 6).

Suppose a case in which the tire contact load is desired to be increased when the vehicle height is approximately at a neutral position. The starting point of a cushioning control (which is described hereinafter) is defined according to a signal from the stroke sensor 21 and the maximum stroke of the actuator 5. The. actuator 5 is extended at an acceleration which is sufficient to achieve a desired dynamic load but below the maximum permissible level defined by the capacity of the actuator and the comfort limit of the vehicle occupants. Normally, the sprung mass is far greater than the unsprung mass. Therefore, the force produced from the actuator is applied to the tire contact surface substantially as a reaction to the inertia force of the sprung mass.

When the actuator is allowed to reach the mechanical end of its stroke without taking any measure, an unacceptably large impact force is produced at the sudden end of the stroke. According to the illustrated embodiment, this situation is avoided by the cushioning control which gradually reduces the speed of the piston rod when it is about to reach an end of its stroke. When this is applied to the active wheel suspension system which uses a suspension spring, the spring reaction can be reduced, and the undesired bouncing movement by the spring can be avoided.

Figure 6:
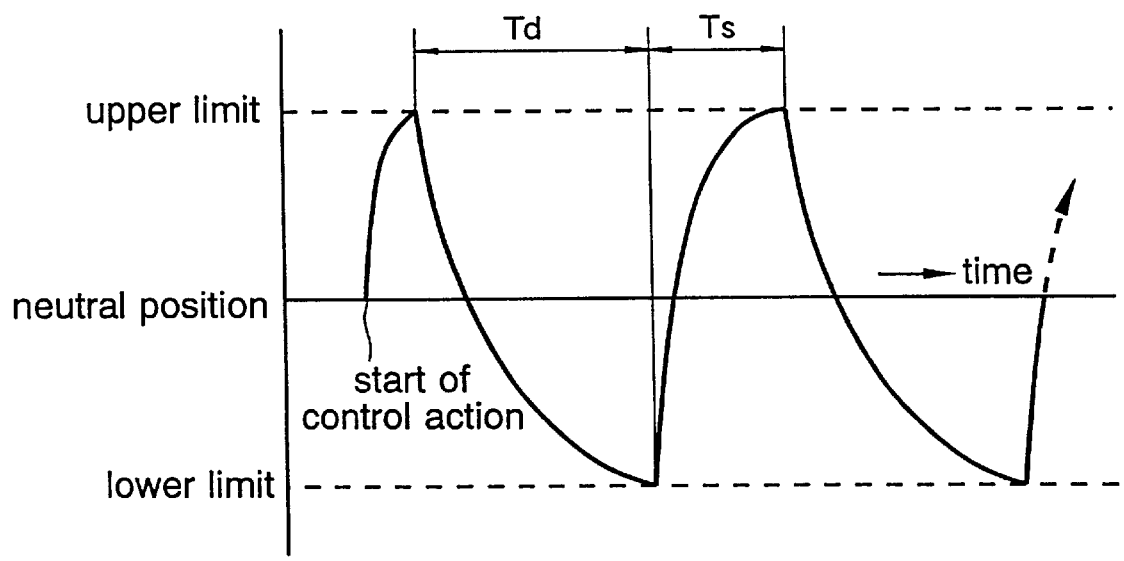
FIG. 6 is a graph showing the cyclic change in the stroke of the suspension system according to the present invention.

When the limit of an extending stroke is reached, the actuator immediately starts a retracting movement. At this point, because the unsprung mass is far smaller than the sprung mass, if the acceleration of the retracting movement of the actuator is excessive, the contact load may drop by a corresponding degree. To avoid any excessive drop in the contact load, the time duration of the retracting movement in each cycle is made substantially larger than the during of the extending movement (Td>Ts) as shown in FIG. 6. In the retracting movement also, a cushioning control is conducted before reaching the end of the retracting stroke. By thus repeating the cyclic extending and retracting movement of the actuator, it is possible to increase the effective tire contact load over a desired period of time. The cyclic movement may be carried out either at a fixed frequency or a variable frequency without departing from the spirit of the present invention. Also, the amplitude of the cyclic movement may be varied depending on each particular need.

The above described embodiment was directed to the case where the contact load of the rear wheels was increased during a braking action. However, the actuator for the four different wheels can be individually controlled in a number of possible ways so that the braking distance may be minimized for each particular set of conditions of the vehicle and the road surface. Also, the present invention is beneficial not only in reducing the locking of wheels during a braking action but also in increasing the wheel traction in acceleration, and increasing the cornering force during a turn. For instance, when an accelerating action of the vehicle is detected by an acceleration sensor, the ECU 18 may selectively increase the tire loads of driven wheels so that the slipping of the driven wheels may be avoided. Also, when a turning action of the vehicle is detected by an appropriate sensor such as a lateral acceleration sensor or a steering angle sensor combined with a vehicle speed sensor, the ECU 18 may selectively increase the tire loads of inner wheels.

Hydraulic cylinders were used for the actuators in the above described embodiment, but other actuators may also be used. Such actuators include, not exclusively, electric motors such as linear motors and moving coils, and mechanical arrangements such as cam mechanisms and spring members. Also, the various sensors may be simplified without departing from the spirit of the invention. For instance, the stroke sensor 21 may be omitted because a stroke can be computed by integrating the difference between the outputs from the acceleration sensors for the sprung mass and the unsprung mass 22 and 23. The load sensor 20 may also be omitted, because the output force of the actuator 5 may be computed from the actual values of the sprung mass and the unsprung mass, and the outputs from the acceleration sensors for the sprung mass and the unsprung mass 22 and 23. Also, the accelerations of the sprung mass and the unsprung mass may be indirectly computed from the outputs of the load sensor and the displacement sensor by defining a state estimating unit. The ECU 18 may consist of a digital computer, an analog computer or a hybrid computer.

Thus, according to the above described embodiment, the acceleration of the unsprung mass and/or the acceleration of the sprung mass are directly controlled by the thrust force produced from an actuator, and an inertia force is produced in one of the masses or both of the masses so that the resulting reaction may be used for increasing the contact load of the tire. By repeating the extending and retracting movement of the actuator, it is possible to maintain the action of increasing the contact load of the tire for a desired period of time. The increase in the tire contact load will be beneficial in reducing the braking distance, avoiding the slipping of the tire, and improving the cornering performance of the vehicle.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle tire contact load control system, comprising:
   a wheel suspension system for supporting an unsprung mass including a wheel to a sprung mass including a vehicle body;
   an active actuator interposed between said unsprung mass and said sprung mass; and
   a controller for extending and retracting said actuator in a cyclic manner so as to apply a prescribed reaction to said unsprung mass during an extending stroke of said actuator.

2. A vehicle tire contact load control system according to claim 1, wherein a retracting stroke of said actuator is substantially longer in time duration than said extending stroke of said actuator.

3. A vehicle tire load control system according to claim 1, wherein a cushioning interval is provided near an end of a retracting stroke and an extending stroke of said actuator.

4. A vehicle tire contact load control system according to claim 1, wherein said wheel suspension system comprises a suspension spring member, and said actuator comprises a linear hydraulic actuator connected in parallel with said suspension spring member.

5. A vehicle tire contact load control system according to claim 1, further comprising an acceleration sensor for detecting a braking action of the vehicle so that said controller selectively increases the tire loads of rear wheels when a braking action is detected.

6. A vehicle tire contact load control system according to claim 1, further comprising an acceleration sensor for detecting an accelerating action of the vehicle so that said controller selectively increases the tire loads of driven wheels when an accelerating action is deteced.

7. A vehicle tire contact load control system according to claim 1, further comprising a sensor for detecting a turning action of the vehicle and said controller controls said actuator so as to selectively increase the tire loads of inner wheels when a turning action is detected.

8. A vehicle tire contact load control system comprising:

a wheel suspension means for suspending an unsprung mass including a wheel from a sprung mass including a vehicle body;

actuator means disposed between said sprung mass and said unsprung mass for imposing a dynamic load on at least one of said sprung mass and said unsprung mass while traveling; and control means for cyclically extending and retracting said actuator means so as to apply a prescribed reaction to said unsprung mass during an extending stroke of said actuator means.

9. A vehicle tire contact load control system according to claim 8, wherein said control means controls a retracting stroke of said actuator means to be substantially longer in time than said extending stroke of said actuator means.

* * * * *

UNITED STATES PATENT AND TRADEMARK OFFICE
CERTIFICATE OF CORRECTION

PATENT NO. : 6,053,509
DATED : 25 April 2000
INVENTOR(S) : Masaki Izawa, Kei Oshida, Hideaki Shibue It is certified that error appears in the above-identified patent and that said Letters Patent is hereby corrected as shown below:

Column 1, line 16, change "dripping" to --gripping--;
        line 57, change "problems" to --limitations--.

Column 2, line 14, change "occurs" to --occur--;
        line 16, after "advantage" insert a comma; after "instance" insert a comma;
        line 23, change "phases" to --phase--.

Column 5, line 18, change "The." to --The--;
        line 44, change "during" to --duration--.

Column 7, line 10 (claim 6, 5th line), change "deteced" to --detected--.

Signed and Sealed this

Twentieth Day of February, 2001

*Attest:*

NICHOLAS P. GODICI

*Attesting Officer*     Acting Director of the United States Patent and Trademark Office